(12) United States Patent
Chien et al.

(10) Patent No.: US 8,406,596 B2
(45) Date of Patent: Mar. 26, 2013

(54) OPTICAL FIBER CONTAINING MULTI-LAYERED COATING SYSTEM

(75) Inventors: Ching-Kee Chien, Horseheads, NY (US); Robert C Moore, Wilmington, NC (US)

(73) Assignee: Corning Incorporated, Corning, NY (US)

(*) Notice: Subject to any disclaimer, the term of this patent is extended or adjusted under 35 U.S.C. 154(b) by 361 days.

(21) Appl. No.: 12/852,922

(22) Filed: Aug. 9, 2010

(65) Prior Publication Data

US 2011/0038593 A1    Feb. 17, 2011

Related U.S. Application Data (60) Provisional application No. 61/233,273, filed on Aug. 12, 2009.

(51) Int. Cl.
*G02B 6/036* (2006.01)

(52) U.S. Cl. ........................................ 385/128

(58) Field of Classification Search .................. None
See application file for complete search history.

(56) References Cited

U.S. PATENT DOCUMENTS

| | | | |
|---|---|---|---|
| 4,076,380 A | 2/1978 | DiMarcello et al. | |
| 4,176,911 A | 12/1979 | Marcatili et al. | |
| 4,270,840 A * | 6/1981 | Uchida et al. | 385/141 |
| 4,300,930 A | 11/1981 | Chang | |
| 4,344,669 A * | 8/1982 | Uchida et al. | 385/141 |
| 4,402,570 A | 9/1983 | Chang | |
| 4,439,008 A | 3/1984 | Joormann et al. | |
| 4,469,401 A * | 9/1984 | Yamazaki et al. | 385/102 |
| 4,474,830 A | 10/1984 | Taylor | |
| 4,608,409 A | 8/1986 | Coady et al. | |
| 4,609,718 A | 9/1986 | Bishop et al. | |
| 4,629,287 A | 12/1986 | Bishop et al. | |
| 4,690,502 A | 9/1987 | Zimmerman et al. | |
| 4,798,852 A | 1/1989 | Zimmerman et al. | |
| 4,851,165 A | 7/1989 | Rennell et al. | |
| 4,921,880 A | 5/1990 | Lee et al. | |
| 4,962,992 A | 10/1990 | Chapin et al. | |
| 5,104,433 A | 4/1992 | Chapin et al. | |
| 5,188,864 A | 2/1993 | Lee et al. | |
| 5,242,963 A | 9/1993 | Mao | |
| 5,729,645 A | 3/1998 | Garito et al. | |
| 6,326,416 B1 | 12/2001 | Chien et al. | |
| 6,531,522 B1 | 3/2003 | Winningham | |
| 6,539,152 B1 | 3/2003 | Fewkes et al. | |
| 6,563,996 B1 | 5/2003 | Winningham | |
| 6,689,463 B2 | 2/2004 | Chou et al. | |
| 6,775,451 B1 | 8/2004 | Botelho et al. | |
| 6,869,981 B2 | 3/2005 | Fewkes et al. | |
| 7,010,206 B1 | 3/2006 | Baker et al. | |
| 7,221,842 B2 | 5/2007 | Baker et al. | |
| 7,423,105 B2 | 9/2008 | Winningham | |
| 8,111,964 B2 * | 2/2012 | Nakajima et al. | 385/128 |
| 2007/0100039 A1 | 5/2007 | Hancock, Jr. et al. | |

FOREIGN PATENT DOCUMENTS

| | | |
|---|---|---|
| EP | 1457468 | 9/2004 |
| GB | 1524316 | 9/1978 |
| GB | 2096353 | 10/1982 |

* cited by examiner

*Primary Examiner* — Michelle R Connelly
(74) *Attorney, Agent, or Firm* — Robert L. Carlson (57) ABSTRACT

The present invention relates to an optical fiber that includes a glass fiber and three or more coatings that encapsulate the glass fiber, where the three or more coatings include a primary coating in contact with said glass fiber, one or more intermediate coatings that surround the primary coating, and a secondary coating that surrounds the intermediate coatings. Both three-coating and four-coating systems are described that afford improve microbend performance.

20 Claims, 5 Drawing Sheets

FIG. 6
Test Fiber 1

FIG. 7
Test Fiber 2

Figure 8

OPTICAL FIBER CONTAINING MULTI-LAYERED COATING SYSTEM

CROSS-REFERENCE TO RELATED APPLICATIONS

This application claims the benefit of, and priority to U.S. Provisional Patent Application No. 61/233,273 filed on Aug. 12, 2009 entitled, "Optical Fiber Containing Multi-Layered Coating System", the content of which is relied upon and incorporated herein by reference in its entirety.

FIELD OF THE INVENTION

The present invention relates generally to optical fiber coating systems, optical fibers containing the coating systems, and their methods of manufacture.

BACKGROUND OF THE INVENTION

Optical fibers typically contain a glass core and at least two coatings, e.g., a primary (or inner) coating and a secondary (or outer) coating. The primary coating is applied directly to the glass fiber and, when cured, forms a soft, elastic, and compliant material which encapsulates the glass fiber. The primary coating serves as a buffer to cushion and protect the glass fiber core when the fiber is bent, cabled, or spooled; but it also protects the glass surface from water adsorption, which can promote crack growth and increase static fatigue that result in failure. The secondary coating is applied over the primary coating and functions as a tough, protective outer layer that prevents damage to the glass fiber during processing and use.

Certain characteristics are desirable for the secondary coating. Before curing, the secondary coating composition should have a suitable viscosity and be capable of curing quickly to enable processing of the optical fiber. After curing, the secondary coating should have the following characteristics: sufficient stiffness to protect the encapsulated glass fiber yet enough flexibility for handling (i.e., modulus), low water absorption, low tackiness to enable handling of the optical fiber, chemical resistance, and sufficient adhesion to the primary coating.

Certain characteristics are desirable for the primary coating. Before curing, the primary coating composition should also have suitable viscosity and be capable of curing quickly to enable processing of the optical fiber. After curing, the primary coating must have a modulus that is sufficiently low to cushion and protect the fiber by readily relieving stresses on the fiber, which can induce microbending and consequent inefficient signal transmission. This cushioning effect must be maintained throughout the fiber's lifetime. Because of differential thermal expansion properties between the primary and secondary coatings, the primary coating must also have a glass transition temperature ($T_g$) that is lower than the foreseeable lowest use temperature, which enables the primary coating to remain elastic throughout the temperature range of use. Finally, it is important for the primary coating to have good glass adhesion properties, yet be mechanically removable from an individual fiber or from a ribbon with reasonable force while leaving insubstantial residue (preferably none).

These requirements place conflicting constraints on the coatings, and especially on the primary coating. Ribbon stripping performance and mechanical damage to the primary are worse when the primary coating is soft and thick, for example, while microbending resistance improves under the same conditions. Protection against static fatigue is also generally worse when the coating is very soft.

To date, manufacturers have offered only coatings that are a compromise between these properties. In response to requirements for more microbend-resistant coatings for fibers in high-density or very small cables, commercial coatings are softer than they were 10 years ago, but throughout, the basic two-layer structure of the fiber coating has not changed. Cablers are continuing to press for further improvements, however, and the two-layer composite may no longer be adequate. It would be desirable, therefore, to develop an optical fiber coating system that improves microbend performance and failure rates due to fatigue over that achieved by conventional two-coating systems, while also maintaining or improving coating stripability.

The present invention is directed to overcoming these deficiencies in the art.

SUMMARY OF THE INVENTION

A first aspect of the present invention relates to an optical fiber that includes a glass fiber and three or more coatings that encapsulate the glass fiber, where the three or more coatings include a primary coating in contact with said glass fiber, one or more intermediate coatings that surrounds the primary coating, and an outer coating that surrounds the one or more intermediate coatings. Preferably, the optical fibers of the present invention have an outer coating diameter (or cross-sectional dimension) of less than about 300 µm.

According to one preferred embodiment, the primary coating has a Young's modulus of about 0.025 to about 3 MPa, more preferably about 0.05 to about 3 MPa and/or a $T_g$ of about −100° C. to about −25° C., and the intermediate coating has one or both of a Young's modulus that is substantially the same as, or lower than, the Young's modulus of the primary coating, and a $T_g$ that is substantially the same as, or lower than, the $T_g$ of the primary coating.

According to another preferred embodiment, the optical fiber includes at least four coatings that encapsulate the glass fiber, where the at least four coatings include a primary coating in contact with said glass fiber, a first intermediate coating that surrounds the primary coating, a second intermediate coating that surrounds the first intermediate coating, and an outer coating that surrounds the second intermediate coating. The first intermediate coating has one or both of a Young's modulus that is higher than a Young's modulus of the primary coating, and a glass transition temperature ($T_g$) that is higher than a $T_g$ of the primary coating; the second intermediate coating has one or both of a Young's modulus that is lower than the Young's modulus of the first intermediate coating, and a $T_g$ that is lower than the $T_g$ of the first intermediate coating; and the outer coating has one or both of a Young's modulus that is higher than the Young's modulus of the second intermediate coating, and a $T_g$ that is higher than the $T_g$ of the second intermediate coating. Preferably, the optical fibers of the present invention have a outer coating diameter (or cross-sectional dimension) of less than about 300 µm.

As used herein, the Young's modulus of a cured primary or second intermediate coating material is measured using a pull-out type in situ modulus test as described in Steeman et al., "Mechanical Analysis of the in-situ Primary Coating Modulus Test for Optical Fibers," in *Proc. of the 52$^{nd}$ International Wire and Cable Symposium* (IWCS, Philadelphia, USA, Nov. 10-13, 2003), Paper 41. The modulus of a cured first intermediate or outer coating material can be determined using Dynamic Mechanical Analysis at a frequency of 1 Hz, or three-point bending of a primary/secondary coating composite structure (after stripping the composite from the glass fiber). Because the modulus of the secondary coating is roughly three orders of magnitude greater than the modulus of the primary coating, the contribution of the primary can be neglected. By "substantially the same," it is meant that the Young's modulus value of a cured product is no more than about 20% higher or lower or, more preferably, no more than about 17.5% higher or lower or, most preferably, no more than about 15% higher or lower than the Young's modulus value of a cured product of a comparative polymeric material.

As used herein, the glass transition temperature ($T_g$) of a coating material refers to the point where its coefficient of thermal expansion changes sharply (i.e., where the loss tangent (tan δ) is a maximum as a function of temperature). Below this temperature the material is brittle, and above this temperature the material is flexible. $T_g$ may be determined by Dynamic Mechanical Analysis at a frequency of 1 Hz. By "substantially the same," it is meant that the $T_g$ is not more than about 10° C. higher or lower, more preferably not more than about 5° C. higher or lower, most preferably not more than about 2° C. higher or lower than the measured $T_g$ of a comparative polymeric material.

A second aspect of the invention relates to an optical fiber ribbon or bundle that includes a plurality of optical fibers according to the first aspect of the present invention and a matrix material encapsulating the plurality of optical fibers.

A third aspect of the invention relates to a telecommunication system that includes an optical fiber according to the first aspect of the present invention or an optical fiber ribbon or bundle according to the second aspect of the present invention.

A fourth aspect of the present invention relates to a method of making an optical fiber according to the first aspect of the present invention. This method includes the steps of coating a glass fiber with three or more polymerizable compositions, and causing the three or more polymerizable compositions to polymerize, and thereby form the three or more coatings that encapsulate the glass fiber, thereby making the optical fiber.

The construction of optical fiber coatings in accordance with the present invention offers a number of advantages. One significant advantage is that the dimensions of the innermost (primary) and outermost (secondary) coatings, which often include expensive additives or even major constituents to control their properties, can be adjusted to reduce the consumption of such additives/constituents per unit length of fiber. For example, by controlling the dimensions of the innermost coating the amount of glass adhesion promoter and surfactant carrier used can be reduced per unit length of fiber, and by controlling the dimensions of the outermost coating the amount of tackifier, lubricant, slip additives, waxes, and additives that improve photon capture efficiency (optical brightener) can be reduced per unit length of fiber. Moreover, use of less oligomers or photoinitiators in one or more of the intermediate coatings should also reduce the total oligomer or photoinitiator content per unit length of fiber. Finally, in certain embodiments of the present invention, the three or more coatings can have a total thickness that is reduced relative to coating systems available on commercial fibers available today. All of these variations should allow significant cost savings. By way of example, the adhesion promoter is often expensive—adding as much as 20% to the cost of the coating, yet it offers little benefit to the bulk properties of the coating. By reducing the dimension of the primary coating, therefore, the overall cost of adhesion promoter can be reduced to less than 10% and even more preferably less than 5% of the total cost of the coating.

Another significant advantage is that the properties of the innermost (primary) and outermost coatings can be improved for their respective functions without interference from undesirable interactions between these coatings, as would occur in conventional two-layer constructions. For example, in two-layer constructions the modulus and $T_g$ of the secondary coating are constrained because it could pull the primary coating away from the glass (Aloisio et al., "Optical Fiber Coating Delamination Using Model Coating Materials," *Proc. of the 51st International Wire and Cable Symposium*, pp. 738-747 (2002); Aloisio et al., "A Viscoelastic Analysis of Thermally Induced Residual Stresses in Dual Coated Optical Fibers," *Proceedings 44th International Wire and Cable Symposium*, pp. 139-145 (1995), each of which is hereby incorporated by reference in its entirety). In the multi-layer structures of the present invention, however, there is more flexibility in choosing these properties because these two coatings are no longer in direct contact. As a result, much higher modulus outer coatings can be employed. Finally, with respect to the four (or more)-layer construction, the presence of a first intermediate coating with relatively higher modulus and $T_g$ affords some protection for the fiber in the event that the outer secondary coating is compromised.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention and together with the description serve to explain the principles and operation of the invention.

DETAILED DESCRIPTION OF THE INVENTION

The present invention relates to optical fibers containing three or more coatings that encapsulate the underlying fiber, as well as their methods of manufacture and use within optical fiber ribbons/cables and telecommunication systems.

The optical fibers of the present invention contain three or more coatings that encapsulate the underlying fiber. The three or more coatings include a primary coating in contact with the glass fiber, one or more intermediate coatings, and an outer coating. By virtue of the presence of the one or more intermediate coatings, it becomes possible to better tailor the properties of the primary and outer coatings to their intended purpose, without deleterious effects of one on the other. These intermediate coatings afford overall improved microbend performance of the optical fiber with lower attenuation losses.

Figure 1:
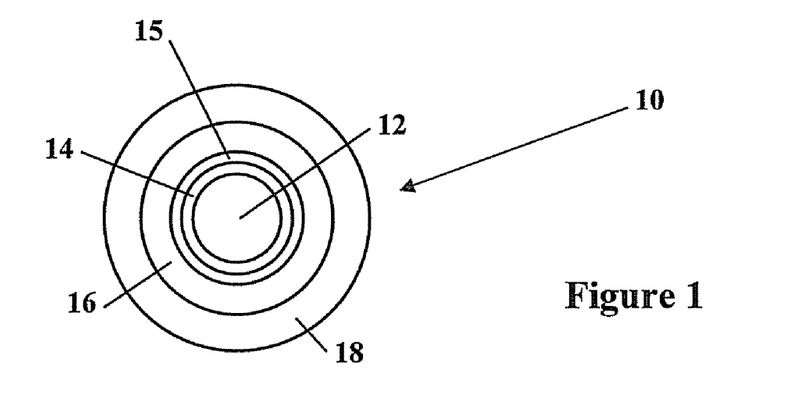
FIG. 1 is a cross-sectional view of a four-layer coating on an optical fiber according to a first embodiment of the present invention.

Referring now to FIG. 1, an optical fiber 10 according to one embodiment of the present invention includes a fiber 12 and four coatings 14, 15, 16, and 18 which encapsulate the fiber 12. Preferably, fiber 12 comprises a glass core. Coating 14 is the primary (innermost) coating, and it serves the traditional purpose of a primary coating as described above. Coating 18 is the outer coating, and it serves the traditional purpose of a secondary coating as described above. Between the primary and secondary coatings are the first intermediate coating 15 and the second intermediate coating 16. The materials and compositions used to prepare these coatings are described below.

The fiber 12 is typically formed of glass, primarily silica glass, and includes both a glass core and a glass coating known as a cladding layer. The glass fiber can be formed according to a number of processes known in the art. In many applications, the glass core and cladding layer have a discernable core-cladding boundary. Alternatively, the core and cladding layer can lack a distinct boundary. One such glass fiber is a step-index fiber. Exemplary step-index fibers are described in U.S. Pat. Nos. 4,300,930 and 4,402,570 to Chang, each of which is hereby incorporated by reference in its entirety. Another such fiber is a graded-index fiber, which has a core whose refractive index varies with distance from the fiber center. A graded-index fiber is formed basically by diffusing the glass core and cladding layer into one another. Exemplary graded-index fibers are described in U.S. Pat. No. 5,729,645 to Garito et al., U.S. Pat. No. 4,439,008 to Joormann et al., U.S. Pat. No. 4,176,911 to Marcatili et al., and U.S. Pat. No. 4,076,380 to DiMarcello et al., each of which is hereby incorporated by reference in its entirety. The glass fiber may also be single- or multi-moded at the wavelength of interest, e.g., 1310 or 1550 nm. The optical fibers of the present invention can contain these or any other conventional core-cladding layer configuration now known or hereafter developed.

The various coatings employed in the optical fibers of the present invention are typically crosslinked during the curing process, except as noted below. These coatings may be formed of one or more oligomers or polymers, one or more monomers, a polymerization initiator (if desired), and one or more optional additives.

The oligomer component, if present, is preferably an ethylenically unsaturated oligomer, more preferably a (meth)acrylate oligomer. The term (meth)acrylate is intended to encompass both acrylates and methacrylates, as well as combinations thereof. The (meth)acrylate terminal groups in such oligomers may be provided by a monohydric poly(meth)acrylate capping component, or by a mono(meth)acrylate capping component such as 2-hydroxyethyl acrylate, in the known manner.

Urethane oligomers are conventionally provided by reacting an aliphatic or aromatic diisocyanate with a dihydric polyether or polyester, most typically a polyoxyalkylene glycol such as a polyethylene glycol. Such oligomers typically have 4-10 urethane groups and may be of high molecular weight, e.g., 2000-8000. However, lower molecular weight oligomers, having molecular weights in the 500-2000 range, may also be used. U.S. Pat. No. 4,608,409 to Coady et al. and U.S. Pat. No. 4,609,718 to Bishop et al., each of which is hereby incorporated by reference, describe such syntheses in detail.

When it is desirable to employ moisture-resistant oligomers, they may be synthesized in an analogous manner, except that the polar polyether or polyester glycols are avoided in favor of predominantly saturated and predominantly nonpolar aliphatic diols. These diols include, for example, alkane or alkylene diols of from 2-250 carbon atoms and, preferably, are substantially free of ether or ester groups. The ranges of oligomer viscosity and molecular weight obtainable in these systems are similar to those obtainable in unsaturated, polar oligomer systems, such that the viscosity and coating characteristics thereof can be kept substantially unchanged. The reduced oxygen content of these coatings has been found not to unacceptably degrade the adherence characteristics of the coatings to the surfaces of the glass fibers being coated.

As is well known, polyurea components may be incorporated in oligomers prepared by these methods, simply by substituting diamines or polyamines for diols or polyols in the course of synthesis. The presence of minor proportions of polyurea components in the present coating systems is not considered detrimental to coating performance, provided only that the diamines or polyamines employed in the synthesis are sufficiently non-polar and saturated as to avoid compromising the moisture resistance of the system.

Suitable ethylenically unsaturated oligomers include polyether urethane acrylate oligomers (CN986 available from Sartomer Company, Inc., West Chester, Pa.) and BR 3731, BR 3741, and STC3-149 available from Bomar Specialty Co., Winstead, Conn.), acrylate oligomers based on tris(hydroxyethyl)isocyanurate, (meth)acrylated acrylic oligomers, polyester urethane acrylate oligomers (CN966 and CN973 available from Sartomer Company, Inc.; and BR7432 available from Bomar Specialty Co.), polyurea urethane acrylate oligomers (e.g., oligomers disclosed in U.S. Pat. Nos. 4,690,502 and 4,798,852 to Zimmerman et al., U.S. Pat. No. 4,609,718 to Bishop, and U.S. Pat. No. 4,629,287 to Bishop et al., each of which is hereby incorporated by reference in its entirety), polyether acrylate oligomers (Genomer 3456 available from Rahn AG, Zurich, Switzerland), polyester acrylate oligomers (Ebecryl 80, 584, and 657 available from UCB Radcure, Atlanta, Ga.), polyurea acrylate oligomers (e.g., oligomers disclosed in U.S. Pat. Nos. 4,690,502 and 4,798,852 to Zimmerman et al., U.S. Pat. No. 4,609,718 to Bishop, and U.S. Pat. No. 4,629,287 to Bishop et al., each of which is hereby incorporated by reference in its entirety), epoxy acrylate oligomers (CN120 available from Sartomer Company, Inc., and Ebecryl 3201 and 3604 available from UCB Radcure), hydrogenated polybutadiene oligomers (Echo Resin MBNX available from Echo Resins and Laboratory, Versailles, Mo.), and combinations thereof.

Alternatively, the oligomer component can also include a non-reactive oligomer component, which as described in U.S. Application Publ. No. 20070100039 to Schissel et al., which is hereby incorporated by reference in its entirety. These non-reactive oligomer components can be used to achieve high modulus coatings that are not excessively brittle. These non-reactive oligomer materials are particularly preferred for the higher modulus coatings.

The oligomer component(s) are typically present in the coating composition in amounts of about 0 to about 90 percent by weight, more preferably between about 25 to about 75 percent by weight, and most preferably between about 40 to about 65 percent by weight.

The coating composition(s) can also include one or more polymer components either as a replacement of the oligomer component or in combination with an oligomer component. The use of polymer components is described, for example, in U.S. Pat. No. 6,869,981 to Fewkes et al., which is hereby incorporated by reference in its entirety.

The polymer can be a block copolymer including at least one hard block and at least one soft block, wherein the hard block has a $T_g$ greater than the $T_g$ of the soft block. Preferably the soft block backbone is aliphatic. Suitable aliphatic backbones include poly(butadiene), polyisoprene, polyethylene/butylene, polyethylene/propylene, and diol blocks. One example of a block copolymer is a di-block copolymer having the general structure of A-B. A further example of a suitable copolymer is a tri-block having the general structure A-B-A. Preferably the mid block has a molecular weight of at least about 10,000, more preferably more than about 20,000, still more preferably more than about 50,000, and most preferably more than about 100,000. In the case of a tri-block copolymer (A-B-A), the mid-block (B, such as butadiene in a SBS copolymer as defined herein) has a $T_g$ of less than about 20° C. An example of a multi-block copolymer, having more than three blocks includes a thermoplastic polyurethane (TPU). Sources of TPU include BASF, B.F. Goodrich, and Bayer. The block copolymer may have any number of multiple blocks.

The polymer component may or may not be chemically cross-linked when cured. Preferably, the polymer is a thermoplastic elastomer polymer. Preferably, the polymer component has at least two thermoplastic terminal end blocks and an elastomeric backbone between two of the end blocks, such as styrenic block copolymers. Suitable thermoplastic terminal end block materials include polystyrene and polymethyl methacrylate. Suitable mid blocks include ethylene propylene diene monomer ("EPDM") and ethylene propylene rubber. The elastomeric mid-block can be polybutadiene, polyisoprene, polyethylene/butylene, and polyethylene/propylene.

Examples of commercially available styrenic block copolymers are KRATON™ (Kraton Polymers, Houston Tex.), CALPRENE™ (Repsol Quimica S.A. Corporation, Spain), SOLPRENE™ (Phillips Petroleum Co), STEREON™ (Firestone Tire & Rubber Co., Akron, Ohio), KRATON™ D1101, which is a styrene-butadiene linear block copolymer (Kraton Polymers), KRATON™ D1193, which is a styrene-isoprene linear block copolymer (Kraton Polymers), KRATON™ FG1901X, which is a styrene-ethylene-butylene block polymer grafted with about 2% w maleic anhydride (Kraton Polymers), KRATON™ D1107, which is a styrene-isoprene linear block copolymer (Kraton Polymers) and HARDMAN ISOLENE™ 400, which is a liquid polyisoprene (Elementis Performance Polymers, Belleville, N.J.).

The polymer component(s), when used, are typically present in the coating composition in amounts of about 5 to about 90 percent by weight, preferably from about 10 percent by weight up to about 30 percent by weight, and most preferably from about 12 percent by weight to about 20 percent by weight.

The one or more monomer components are preferably ethylenically unsaturated. Suitable functional groups for ethylenically unsaturated monomers used in accordance with the present invention include, without limitation, acrylates, methacrylates, acrylamides, N-vinyl amides, styrenes, vinyl ethers, vinyl esters, acid esters, and combinations thereof (i.e., for polyfunctional monomers). Of these, the (meth)acrylate monomers are usually preferred.

Generally, a lower molecular weight (i.e., about 120 to 600) liquid (meth)acrylate-functional monomer is added to the formulation to provide the liquidity needed to apply the coating composition with conventional liquid coating equipment. Typical acrylate-functional liquids in these systems include monofunctional and polyfunctional acrylates (i.e., monomers having two or more acrylate functional groups). Illustrative of these polyfunctional acrylates are the difunctional acrylates, which have two functional groups; the trifunctional acrylates, which have three functional groups; and the tetrafunctional acrylates, which have four functional groups. Monofunctional and polyfunctional methacrylates may be employed together.

When it is desirable to utilize moisture-resistant components, the monomer component will be selected on the basis of its compatibility with the selected moisture-resistance oligomer. Not all such liquid monomers may be successfully blended and copolymerized with the moisture-resistant oligomers, because such oligomers are highly non-polar. For satisfactory coating compatibility and moisture resistance, it is desirable to use a liquid acrylate monomer component comprising a predominantly saturated aliphatic mono- or di-acrylate monomer or alkoxy acrylate monomers.

Suitable polyfunctional ethylenically unsaturated monomers include, without limitation, alkoxylated bisphenol A diacrylates such as ethoxylated bisphenol A diacrylate with ethoxylation being 2 or greater, preferably ranging from 2 to about 30 (SR349 and SR601 available from Sartomer Company, Inc.; and Photomer 4025 and Photomer 4028, available from Cognis Corp., Ambler, Pa.), and propoxylated bisphenol A diacrylate with propoxylation being 2 or greater, preferably ranging from 2 to about 30; methylolpropane polyacrylates with and without alkoxylation such as ethoxylated trimethylolpropane triacrylate with ethoxylation being 3 or greater, preferably ranging from 3 to about 30 (Photomer 4149 available from Cognis Corp., and SR499 available from Sartomer Company, Inc.), propoxylated trimethylolpropane triacrylate with propoxylation being 3 or greater, preferably ranging from 3 to 30 (Photomer 4072 available from Cognis Corp.; and SR492 available from Sartomer Company, Inc.), and ditrimethylolpropane tetraacrylate (Photomer 4355 available from Cognis Corp.); alkoxylated glyceryl triacrylates such as propoxylated glyceryl triacrylate with propoxylation being 3 or greater (Photomer 4096 available from Cognis Corp.; and SR9020 available from Sartomer Company, Inc.); erythritol polyacrylates with and without alkoxylation, such as pentaerythritol tetraacrylate (SR295 available from Sartomer Company, Inc.), ethoxylated pentaerythritol tetraacrylate (SR494 available from Sartomer Company, Inc.), and dipentaerythritol pentaacrylate (Photomer 4399 available from Cognis Corp.; and SR399 available from Sartomer Company, Inc.); isocyanurate polyacrylates formed by reacting an appropriate functional isocyanurate with an acrylic acid or acryloyl chloride, such as tris-(2-hydroxyethyl)isocyanurate triacrylate (SR368 available from Sartomer Company, Inc.) and tris-(2-hydroxyethyl)isocyanurate diacrylate; alcohol polyacrylates with and without alkoxylation such as tricyclodecane dimethanol diacrylate (CD406 available from Sartomer Company, Inc.) and ethoxylated polyethylene glycol diacrylate with ethoxylation being 2 or greater, preferably ranging from about 2 to 30; epoxy acrylates formed by adding acrylate to bisphenol A diglycidylether and the like (Photomer 3016 available from Cognis Corp.); and single and multi-ring cyclic aromatic or non-aromatic polyacrylates such as dicyclopentadiene diacrylate.

It may also be desirable to use certain amounts of monofunctional ethylenically unsaturated monomers, which can be introduced to influence the degree to which the cured product absorbs water, adheres to other coating materials, or behaves under stress. Exemplary monofunctional ethylenically unsaturated monomers include, without limitation, hydroxyalkyl acrylates such as 2-hydroxyethyl-acrylate, 2-hydroxypropyl-acrylate, and 2-hydroxybutyl-acrylate; long- and short-chain alkyl acrylates such as methyl acrylate, ethyl acrylate, propyl acrylate, isopropyl acrylate, butyl acrylate, amyl acrylate, isobutyl acrylate, t-butyl acrylate, pentyl acrylate, isoamyl acrylate, hexyl acrylate, heptyl acrylate, octyl acrylate, isooctyl acrylate (SR440 available from Sartomer Company, Inc. and Ageflex FA8 available from CPS Chemical Co.), 2-ethylhexyl acrylate, nonyl acrylate, decyl acrylate, isodecyl acrylate (SR395 available from Sartomer Company, Inc.; and Ageflex FA10 available from CPS Chemical Co.), undecyl acrylate, dodecyl acrylate, tridecyl acrylate (SR489 available from Sartomer Company, Inc.), lauryl acrylate (SR335 available from Sartomer Company, Inc., Ageflex FA12 available from CPS Chemical Co., Old Bridge, N.J.), and (Photomer 4812 available from Cognis Corp.), octadecyl acrylate, and stearyl acrylate (SR257 available from Sartomer Company, Inc.); aminoalkyl acrylates such as dimethylaminoethyl acrylate, diethylaminoethyl acrylate, and 7-amino-3,7-dimethyloctyl acrylate; alkoxyalkyl acrylates such as butoxylethyl acrylate, phenoxyethyl acrylate (SR339 available from Sartomer Company, Inc., Ageflex PEA available from CPS Chemical Co., and Photomer 4035 available from Cognis Corp.), phenoxyglycidyl acrylate (CN131 available from Sartomer Company, Inc.), lauryloxyglycidyl acrylate (CN130 available from Sartomer Company, Inc.), and ethoxyethoxyethyl acrylate (SR256 available from Sartomer Company, Inc.); single and multi-ring cyclic aromatic or non-aromatic acrylates such as cyclohexyl acrylate, benzyl acrylate, dicyclopentadiene acrylate, dicyclopentanyl acrylate, tricyclodecanyl acrylate, bornyl acrylate, isobornyl acrylate (SR423 and SR506 available from Sartomer Company, Inc., and Ageflex IBOA available from CPS Chemical Co.), tetrahydrofurfuryl acrylate (SR285 available from Sartomer Company, Inc.), caprolactone acrylate (SR495 available from Sartomer Company, Inc.; and Tone M100 available from Union Carbide Company, Danbury, Conn.), and acryloylmorpholine; alcohol-based acrylates such as polyethylene glycol monoacrylate, polypropylene glycol monoacrylate, methoxyethylene glycol acrylate, methoxypolypropylene glycol acrylate, methoxypolyethylene glycol acrylate, ethoxydiethylene glycol acrylate, and various alkoxylated alkylphenol acrylates such as ethoxylated(4) nonylphenol acrylate (Photomer 4003 available from Cognis Corp.; and SR504 available from Sartomer Company, Inc.) and propoxylated-nonylphenol acrylate (Photomer 4960 available from Cognis Corp.); acrylamides such as diacetone acrylamide, isobutoxymethyl acrylamide, N,N'-dimethyl-aminopropyl acrylamide, N,N-dimethyl acrylamide, N,N-diethyl acrylamide, and t-octyl acrylamide; vinylic compounds such as N-vinylpyrrolidone and N-vinylcaprolactam (both available from International Specialty Products, Wayne, N.J.); and acid esters such as maleic acid ester and fumaric acid ester.

The monomer component(s) are typically present in the coating composition in amounts of about 10 to about 90 percent by weight, more preferably between about 20 to about 60 percent by weight, and most preferably between about 25 to about 50 percent by weight.

As is well known, optical fiber coating compositions may also contain a polymerization initiator which is suitable to cause polymerization (i.e., curing) of the composition after its application to a glass fiber. Polymerization initiators suitable for use in the primary coating compositions of the present invention include thermal initiators, chemical initiators, electron beam initiators, and photoinitiators. Particularly preferred are the photoinitiators. For most acrylate-based coating formulations, conventional photoinitiators, such as the known ketonic photoinitiators and/or phosphine oxide photoinitiators, are preferred. When used in the compositions of the present invention, the photoinitiator is present in an amount sufficient to provide rapid ultraviolet curing. Generally, this includes between about 0.5 to about 10.0 percent by weight, more preferably between about 1.5 to about 7.5 percent by weight. Where lower degrees of cure are desired, or no curing is required, the amount of photoinitiator employed in a particular composition can be less than 0.5 percent by weight or omitted entirely.

The photoinitiator, when used in a small but effective amount to promote radiation cure, should provide reasonable cure speed without causing premature gelation of the coating composition. A desirable cure speed is any speed sufficient to cause substantial curing of the coating materials. As measured in a dose versus modulus curve, a cure speed for coating thicknesses of about 25-35 µm is, e.g., less than 1.0 J/cm$^2$, preferably less than 0.5 J/cm$^2$.

Suitable photoinitiators include 1-hydroxycyclohexylphenyl ketone (Irgacure 184 available from Ciba Specialty Chemical, Hawthorne, N.Y.), (2,6-dimethoxybenzoyl)-2,4,4-trimethylpentyl phosphine oxide (commercial blends Irgacure 1800, 1850, and 1700 available from Ciba Specialty Chemical), 2,2-dimethoxyl-2-phenyl acetophenone (Irgacure 651, available from Ciba Specialty Chemical), bis(2,4,6-trimethyl benzoyl)phenyl-phosphine oxide (Irgacure 819, available from Ciba Specialty Chemical), (2,4,6-trimethylbenzoyl)diphenyl phosphine oxide (Lucerin TPO available from BASF, Munich, Germany), ethoxy(2,4,6-trimethylbenzoyl)phenyl phosphine oxide (Lucerin TPO-L from BASF), and combinations thereof.

The coatings can optionally include one or more additional additives. These additives include, without limitation, catalysts, carrier surfactants, tackifiers, adhesion promoters, antioxidants, stabilizers, reactive diluents, lubricants, optical brighteners, and low molecular weight non-crosslinking resins. Some additives, for example, catalysts, reactive surfactants, and optical brighteners, can operate to control the polymerization process, thereby affecting the physical properties (e.g., modulus, glass transition temperature) of the polymerization product formed from the coating composition. Others can affect the integrity of the polymerization product of the coating composition (e.g., protect against de-polymerization or oxidative degradation).

An exemplary catalyst is a tin-catalyst, which is used to catalyze the formation of urethane bonds in some oligomer components. Whether the catalyst remains as an additive of the oligomer component or additional quantities of the catalyst are introduced into the composition of the present invention, the presence of the catalyst can act to stabilize the oligomer component in the composition.

Suitable carriers, more specifically carriers which function as reactive surfactants, include polyalkoxypolysiloxanes. Preferred carriers are available from Goldschmidt Chemical Co. (Hopewell, Va.) under the tradename TEGORAD 2200 and TEGORAD 2700 (acrylated siloxane). These reactive surfactants may be present in a preferred amount between about 0.01 to about 5 pph, more preferably about 0.25 to about 3 pph.

Other classes of suitable carriers are polyols and non-reactive surfactants. Examples of suitable polyols and non-reactive surfactants include the polyol Aclaim 3201 (poly(ethylene oxide-co-propylene oxide)) available from Lyondel (formerly known as Arco Chemicals) (Newtowne Square, Pa.), and the non-reactive surfactant Tegoglide 435 (polyalkoxy-polysiloxane) available from Goldschmidt Chemical Co. The polyol or non-reactive surfactants may be present in a preferred amount between about 0.01 pph to about 10 pph, more preferably about 0.05 to about 5 pph, most preferably about 0.1 to about 2.5 pph.

Suitable carriers may also be ambiphilic molecules. An ambiphilic molecule is a molecule that has both hydrophilic and hydrophobic segments. The hydrophobic segment may alternatively be described as a lipophilic (fat/oil loving) segment. A tackifier is an example of one such ambiphilic molecule. A tackifier is a molecule that can modify the time-sensitive rheological property of a polymer product. In general a tackifier additive will make a polymer product act stiffer at higher strain rates or shear rates and will make the polymer product softer at low strain rates or shear rates. A tackifier is an additive that is commonly used in the adhesives industry, and is known to enhance the ability of a coating to create a bond with an object that the coating is applied upon.

A preferred tackifier is Uni-tac® R-40 (hereinafter "R-40") available from International Paper Co., Purchase, N.Y. R-40 is a tall oil rosin, which contains a polyether segment, and is from the chemical family of abietic esters. Preferably, the tackifier is present in the composition in an amount between about 0.01 to about 10 pph, more preferably in the amount between about 0.05 to about 5 pph. A suitable alternative tackifier is the Escorez series of hydrocarbon tackifiers available from Exxon. For additional information regarding Escorez tackifiers, see U.S. Pat. No. 5,242,963 to Mao, which is hereby incorporated by reference in its entirety. The aforementioned carriers may also be used in combination.

Any suitable adhesion promoter can be employed. Examples of a suitable adhesion promoter include organo-functional silanes, titanates, zirconates, and mixtures thereof. Preferably, the adhesion promoter is a poly(alkoxy)silane, most preferably bis(trimethoxysilylethyl)benzene. Suitable alternative adhesion promoters include 3-mercaptopropyltrimethoxysilane (3-MPTMS, available from United Chemical Technologies, Bristol, Pa.; also available from Gelest, Morrisville, Pa.), 3-acryloxypropyltrimethoxysilane (available from Gelest), and 3-methacryloxypropyltrimethoxysilane (available from Gelest), and bis(trimethoxysilylethyl)benzene (available from Gelest). Other suitable adhesion promoters are described in U.S. Pat. Nos. 4,921,880 and 5,188,864 to Lee et al., each of which is hereby incorporated by reference. The adhesion promoter, if present, is used in an amount between about 0.1 to about 10 pph, more preferably about 0.25 to about 3 pph.

Any suitable antioxidant can be employed. Preferred antioxidants include, without limitation, bis hindered phenolic sulfide or thiodiethylene bis(3,5-di-tert-butyl)-4-hydroxyhydrocinnamate (Irganox 1035, available from Ciba Specialty Chemical). The antioxidant, if present, is used in an amount between about 0.1 to about 3 pph, more preferably about 0.25 to about 2 pph.

Any suitable stabilizer can be employed. One preferred stabilizer is a tetrafunctional thiol, e.g., pentaerythritol tetrakis(3-mercaptopropionate) from Sigma-Aldrich (St. Louis, Mo.). The stabilizer, if present, is used in an amount between about 0.01 to about 1 pph, more preferably about 0.01 to about 0.2 pph.

Any suitable optical brightener can be employed. Exemplary optical brighteners include, without limitation, Uvitex OB, a 2,5-thiophenediylbis(5-tert-butyl-1,3-benzoxazole) (Ciba Specialty Chemical); Blankophor KLA, available from Bayer; bisbenzoxazole compounds; phenylcoumarin compounds; and bis(styryl)biphenyl compounds. The optical brightener is desirably present in the composition at a concentration of about 0.003 to about 0.5 pph, more preferably about 0.005 to about 0.3 pph.

As used herein, the weight percent of a particular component refers to the amount introduced into the bulk composition excluding any additives. The amount of additives that are introduced into the bulk composition to produce a composition of the present invention is listed in parts per hundred. For example, an oligomer, monomer, and photoinitiator are combined to form the bulk composition such that the total weight percent of these components equals 100 percent. To this bulk composition, an amount of a particular additive, for example 1 part per hundred, is introduced in excess of the 100 weight percent of the bulk composition.

Turning again to FIG. 1, and the coating system illustrated therein, primary coating 14 is preferably formed from a soft crosslinked polymer material having a low Young's modulus (e.g., less than about 5 MPa at 25° C.) and a low $T_g$ (e.g., less than about −10° C.). The Young's modulus of primary coating 14 is preferably between about 0.025 to about 3 MPa, more preferably between about 0.05 to about 3 MPa, more preferably between about 0.1 MPa and about 3 MPa, even more preferably between about 0.05 MPa and about 0.5 MPa, and most preferably between about 0.05 MPa and about 0.3 MPa. The $T_g$ is preferably between about −100° C. and about −25° C., more preferably between about −100° C. and about −40° C., most preferably between about −100° C. and about −50° C. The primary coating preferably has a thickness that is less than about 25 μm, more preferably less than about 20 μm, even more preferably less than about 15 μm, and most preferably in the range of about 5 μm to about 10 μm. Primary coatings are typically applied to the glass fiber as a liquid and cured, as will be described in more detail hereinbelow. Various additives that enhance one or more properties of the primary coating can also be present, including antioxidants, adhesion promoters, carrier surfactants, tackifiers, catalysts, stabilizers, surface agents, and optical brighteners.

A number of suitable primary coatings are disclosed, for example, in U.S. Pat. No. 6,326,416 to Chien et al., U.S. Pat. No. 6,531,522 to Winningham et al., U.S. Pat. No. 6,539,152 to Fewkes et al., U.S. Pat. No. 6,563,996 to Winningham, U.S. Pat. No. 6,869,981 to Fewkes et al., U.S. Pat. No. 7,010,206 and U.S. Pat. No. 7,221,842 to Baker et al., and U.S. Pat. No. 7,423,105 to Winningham, each of which is incorporated herein by reference in its entirety.

Suitable primary coating compositions include, without limitation, about 25 to 75 weight percent of one or more urethane acrylate oligomers; about 25 to about 65 weight percent of one or more monofunctional ethylenically unsaturated monomers; about 0 to about 10 weight percent of one or more multifunctional ethylenically unsaturated monomers; about 1 to about 5 weight percent of one or more photoinitiators; about 0.5 to about 1.5 pph of one or more antioxidants; about 0.5 to about 1.5 pph of one or more adhesion promoters; and about 0.01 to about 0.5 pph of one or more stabilizers.

Other suitable primary coating compositions include about 52 weight percent polyether urethane acrylate (BR 3741 from Bomar Specialties Company), between about 40 to about 45 weight percent of polyfunctional acrylate monomer (Photomer 4003 or Photomer 4960 from Cognis), between 0 to about 5 weight percent of a monofunctional acrylate monomer (caprolactone acrylate or N-vinylcaprolactam), up to about 1.5 weight percent of a photoinitiator (Irgacure 819 or Irgacure 184 from Ciba Specialty Chemical, LUCIRIN® TPO from BASF, or combination thereof), to which is added about 1 pph adhesion promoter (3-acryloxypropyltrimethoxysilane), about 1 pph antioxidant (Irganox 1035 from Ciba Specialty Chemical), optionally up to about 0.05 pph of an optical brightener (Uvitex OB from Ciba Specialty Chemical), and optionally up to about 0.03 pph stabilizer (pentaerythritol tetrakis(3-mercaptoproprionate) available from Sigma-Aldrich).

Exemplary primary coating compositions include, without limitation, the following formulations:
(1) 52 weight percent polyether urethane acrylate oligomer (BR 3741, Bomar Specialty), 40 weight percent ethoxylated(4) nonylphenol acrylate (Photomer 4003, Cognis Corp.), 5 weight percent N-vinyl pyrollidinone, 1.5 weight percent bis(2,4,6-trimethyl benzoyl)phenyl-phosphine oxide (Irgacure 819, Ciba Specialty), 1.5 weight percent 1-hydroxycyclohexylphenyl ketone (Irgacure 184, Ciba Specialty), 1 pph thiodiethylene bis(3,5-di-tert-butyl)-4-hydroxyhydrocinnamate (Irganox 1035, Ciba Specialty), and 1 pph 3-acryloxypropyltrimethoxysilane;
(2) 52 weight percent polyether urethane acrylate oligomer (BR 3741, Bomar Specialty), 40 weight percent ethoxylated(4) nonylphenol acrylate (Photomer 4003, Cognis Corp.), 5 weight percent N-vinyl caprolactam, 1.5 weight percent bis(2,4,6-trimethyl benzoyl)phenyl-phosphine oxide (Irgacure 819, Ciba Specialty), 1.5 weight percent 1-hydroxycyclohexylphenyl ketone (Irgacure 184, Ciba Specialty), 1 pph thiodiethylene bis(3,5-di-tert-butyl)-4-hydroxyhydrocinnamate (Irganox 1035, Ciba Specialty), and 1 pph 3-acryloxypropyltrimethoxysilane;
(3) 52 weight percent polyether urethane acrylate oligomer (BR3731, Sartomer Co.), 45 weight percent ethoxylated(4) nonylphenol acrylate (SR504, Sartomer Co.), 3 weight percent (2,6-dimethoxybenzoyl)-2,4,4-trimethylpentyl phosphine oxide (Irgacure 1850, Ciba Specialty), 1 pph thiodiethylene bis(3,5-di-tert-butyl)-4-hydroxyhydrocinnamate (Irganox 1035, Ciba Specialty), 1 pph bis(trimethoxysilylethyl)benzene adhesion promoter, and 0.5 pph polyalkoxypolysiloxane carrier (Tegorad 2200, Goldschmidt); and
(4) 52 weight percent polyether urethane acrylate oligomers (BR3731, Sartomer Co.), 45 weight percent ethoxylated(4) nonylphenol acrylate (Photomer 4003, Cognis Corp.), 3 weight percent (2,6-dimethoxybenzoyl)-2,4,4-trimethylpentyl phosphine oxide (Irgacure 1850, Ciba Specialty), 1 pph thiodiethylene bis(3,5-di-tert-butyl)-4-hydroxyhydrocinnamate (Irganox 1035, Ciba Specialty), 1 pph bis(trimethoxysilylethyl)benzene adhesion promoter, and 0.5 pph tackifier (Unitac R-40, Union Camp);
(5) 52 weight percent polyether urethane acrylate oligomers (BR3731, Sartomer Co.), 45 weight percent ethoxylated-nonylphenol acrylate (SR504, Sartomer Co.), and 3 weight percent (2,6-dimethoxybenzoyl)-2,4,4-trimethylpentyl phosphine oxide (Irgacure 1850, Ciba Specialty); and
(6) 52 weight percent urethane acrylate oligomer (BR3741, Bomar), 41.5 weight percent ethoxylated nonyl phenol acrylate monomer (Photomer 4003, Cognis), 5 weight percent caprolactone acrylate monomer (Tone M-100, Dow), 1.5 weight percent Irgacure 819 photoinitiator (Ciba), 1 pph thiodiethylene bis(3,5-di-tert-butyl)-4-hydroxyhydrocinnamate (Irganox 1035, Ciba Specialty), 1 pph 3-acryloxypropyltrimethoxysilane (Gelest), and 0.032 pph pentaerythritol tetrakis (3-mercaptopropionate) (Aldrich).

The outer coating material 18 is typically the polymerization product of a coating composition that contains urethane acrylate liquids whose molecules become highly cross-linked when polymerized. In some preferred embodiments, the outer coating is not a thermoplastic material. Outer coating 18 has a high Young's modulus (e.g., greater than about 0.08 GPa at 25° C.) and a high $T_g$ (e.g., greater than about 50° C.). The Young's modulus is preferably between about 0.1 GPa and about 8 GPa, more preferably between about 0.5 GPa and about 5 GPa, and most preferably between about 0.5 GPa and about 3 GPa. The $T_g$ is preferably between about 50° C. and about 120° C., more preferably between about 50° C. and about 100° C. The secondary coating has a thickness that is less than about 40 μm, more preferably between about 20 to about 40 μm, most preferably between about 20 to about 30 μm.

Other suitable materials for use in outer coating materials, as well as considerations related to selection of these materials, are well known in the art and are described in U.S. Pat. Nos. 4,962,992 and 5,104,433 to Chapin, each of which is hereby incorporated by reference in its entirety. As an alternative to these, high modulus coatings have also been obtained using low oligomer content and low urethane content coating systems, as described in U.S. Pat. No. 6,775,451 to Botelho et al., and U.S. Pat. No. 6,689,463 to Chou et al., each of which is hereby incorporated by reference in its entirety. In addition, non-reactive oligomer components have been used to achieve high modulus coatings, as described in U.S. Application Publ No. 20070100039 to Schissel et al., which is hereby incorporated by reference in its entirety. Outer coatings are typically applied to the previously coated fiber (either with or without prior curing) and subsequently cured, as will be described in more detail hereinbelow. Various additives that enhance one or more properties of the coating can also be present, including antioxidants, catalysts, lubricants, low molecular weight non-crosslinking resins, stabilizers, surfactants, surface agents, slip additives, waxes, micronized-polytetrafluoroethylene, etc. The secondary coating may also include an ink, as is well known in the art.

Suitable outer coating compositions include, without limitation, about 0 to 20 weight percent of one or more urethane acrylate oligomers; about 75 to about 95 weight percent of one or more monofunctional ethylenically unsaturated monomers; about 0 to about 10 weight percent of one or more multifunctional ethylenically unsaturated monomers; about 1 to about 5 weight percent of one or more photoinitiators; and about 0.5 to about 1.5 pph of one or more antioxidants.

Other suitable outer coating compositions include, without limitation, about 10 weight percent of a polyether urethane acrylate oligomer (KWS 4131 from Bomar Specialty Co.), about 72 to about 82 weight percent ethoxylated (4) bisphenol A diacrylate monomer (Photomer 4028 from Cognis), about 5 weight percent bisphenol A diglycidyl diacrylate (Photomer 3016 from Cognis), optionally up to about 10 weight percent of a diacrylate monomer (Photomer 4002 from Cognis) or N-vinylcaprolactam, up to about 3 weight percent of a photoinitiator (Irgacure 184 from Ciba Specialty Chemical, or Lucirin® TPO from BASF, or combination thereof), to which is added about 0.5 pph antioxidant (Irganox 1035 from Ciba Specialty Chemical).

Exemplary outer coating compositions include, without limitation, the following formulations:

(1) 40 weight percent urethane acrylate oligomer (CN981, Sartomer Company, Inc.), 17 weight percent propoxylated (3) glyceryl triacrylate monomer (SR9020, Sartomer Inc.), 25 weight percent pentaerythritol tetraacrylate (SR295, Sartomer Inc.), 15 weight percent ethoxylated(2) bisphenol A diacrylate monomer (SR349, Sartomer Inc.), and 3 weight percent of 1-hydroxycyclohexyl phenyl ketone and bis(2,6-dimethoxybenrzoyl)-2,4,4-trimethylpentyl phosphine oxide blend (Irgacure 1850, Ciba Specialty Chemical); and (2) 10 weight percent polyether urethane acrylate (KWS 4131, Bomar), 5 weight percent bisphenol A diglycidyl diacrylate (Photomer 3016, Cognis), 82 weight percent ethoxylated (4) bisphenol A diacrylate (Photomer 4028, Cognis), 1.5 weight percent Lucirin TPO photoinitiator (BASF), 1.5 weight percent 1-hydroxycyclohexylphenyl ketone (Irgacure 184, Ciba), and 0.5 pph thiodiethylene bis(3,5-di-tert-butyl-4-hydroxy)hydrocinnamate antioxidant (Irganox 1035, Ciba Specialty Chemical).

The first intermediate coating 15 is typically the polymerization product of a coating composition that affords a relatively higher Young's modulus and a relatively higher $T_g$ as compared to the Young's modulus and $T_g$ of the primary coating. The Young's modulus is preferably between about 0.1 GPa and about 2 GPa, more preferably between about 0.2 GPa and about 1 GPa, and most preferably between about 0.3 GPa and about 1 GPa. The $T_g$ is preferably between about 0° C. and about 60° C., more preferably between about 10° C. and about 60° C., most preferably between about 10° C. and about 50° C. The first intermediate coating has a thickness that is less than about 25 μm, more preferably less than about 20 μm, even more preferably less than about 15 μm, and most preferably in the range of about 5 μm to about 10 μm.

The first intermediate coating can be formulated using any number of compositions previously known for use in forming outer (or secondary) coatings, and these include the low oligomer content and low urethane content coating systems, as described, for example, in U.S. Pat. No. 6,775,451 to Botelho et al., and U.S. Pat. No. 6,689,463 to Chou et al., and U.S. Application Publ No. 20070100039 to Schissel et al., each of which is hereby incorporated by reference in its entirety. This coating may optionally contain an ink, as is well known in the art. In certain embodiments, the first intermediate coating preferably omits expensive additives that are useful for modifying properties of the cured product, such as lubricants, slip additives, and waxes.

Suitable first intermediate coating compositions include, without limitation, about 0 to 20 weight percent of one or more urethane acrylate oligomers; about 75 to about 95 weight percent of one or more monofunctional ethylenically unsaturated monomers; about 0 to about 10 weight percent of one or more multifunctional ethylenically unsaturated monomers; about 1 to about 5 weight percent of one or more photoinitiators; and about 0.5 to about 1.5 pph of one or more antioxidants.

Exemplary first intermediate coating compositions include, without limitation, the following formulations:

(1) 10 weight percent aliphatic urethane acrylate oligomer (KWS4131, Bomar Specialty Co.), 87 weight percent ethoxylated(4) bisphenol A diacrylate monomer (Photomer 4028, Cognis Corp.), 3 weight percent of 1-hydroxycyclohexyl phenyl ketone and bis(2,6-dimethoxybenrzoyl)-2,4,4-trimethylpentyl phosphine oxide blend (Irgacure 1850, Ciba Specialty Chemical), 0.5 pph thiodiethylene bis(3,5-di-tert-butyl-4-hydroxy)hydrocinnamate antioxidant (Irganox 1035, Ciba Specialty Chemical), and 1 pph adhesion promoter having acrylate and acid functionality (Ebecryl 170, UCB Radcure);

(2) 10 weight percent polyether-based urethane diacrylate oligomer (BR301, Bomar Specialty Co.), 22 weight percent ethoxylated(8) bisphenol A diacrylate monomer (Photomer 4025, Cognis Corp.), 65 weight percent ethoxylated (4) bisphenol A diacrylate monomer (Photomer 4028, Cognis Corp.), 3 weight percent of 1-hydroxycyclohexyl phenyl ketone and bis(2,6-dimethoxybenrzoyl)-2,4,4-trimethylpentyl phosphine oxide blend (Irgacure 1850, Ciba Specialty Chemical), 0.5 pph thiodiethylene bis(3,5-di-tert-butyl-4-hydroxy)hydrocinnamate antioxidant (Irganox 1035, Ciba Specialty Chemical), and 1 pph adhesion promoter having acrylate and acid functionality (Ebecryl 170, UCB Radcure);

(3) 10 weight percent aliphatic urethane acrylate oligomer (KWS4131, Bomar Specialty Co.), 50 weight percent ethoxylated(4) bisphenol A diacrylate monomer (Photomer 4028, Cognis Corp.), 37 weight percent ethoxylated (3) bisphenol A diacrylate monomer (RCC12-984, Cognis Corp.), 3 weight percent of 1-hydroxycyclohexyl phenyl ketone and bis(2,6-dimethoxybenrzoyl)-2,4,4-trimethylpentyl phosphine oxide blend (Irgacure 1850, Ciba Specialty Chemical), 0.5 pph thiodiethylene bis(3,5-di-tert-butyl-4-hydroxy)hydrocinnamate antioxidant (Irganox 1035, Ciba Specialty Chemical); and (4) 30 weight percent ethoxylated(4) bisphenol A diacrylate monomer (SR601, Sartomer Co.), 37 weight percent ethoxylated(10) bisphenol A diacrylate monomer (SR602, Sartomer Co.), 30 weight percent ethoxylated(2) bisphenol A diacrylate monomer (SR349, Sartomer Co.), and 3 weight percent of 1-hydroxycyclohexyl phenyl ketone and bis(2,6-dimethoxybenrzoyl)-2,4,4-trimethylpentyl phosphine oxide blend (Irgacure 1850, Ciba Specialty Chemical).

The second intermediate coating 16 can either be in the form of a soft cross-linked polymer material, like primary coating 14, or in the form of weakly cross-linked or even substantially liquid coating material. The second intermediate coating preferably exhibits a relatively lower Young's modulus and/or a relatively lower $T_g$ as compared to the Young's modulus and $T_g$ of the first intermediate coating. For example, in one preferred embodiment, the Young's modulus of the second intermediate coating is roughly three orders of magnitude smaller and the difference between the $T_g$'s of these coating materials is at least about 70° C.

According to one embodiment, the second intermediate coating remains significantly liquid even after the curing process (that cures the remaining coatings). As used herein, "significantly liquid" means that the coating exhibits less than about 70% cure following the curing process, more preferably less than about 60% cure, most preferably less than about 50% cure. Coatings that remain significantly liquid exhibit limited cross-linking of the components in the coating composition. This can be achieved through the use of non-reactive oligomer components, non-acrylate monomer components and non-crosslinking resins and fillers.

The reduction of photoinitiator reactants from the second intermediate coating composition can also significantly reduce the degree of cure and, thus, contribute to a lower degree of cross-linking. In this embodiment, the photoinitiator can be reduced to less than about 5 weight percent, more preferably less than 3 weight percent, most preferably less than about 1 weight percent.

According to an alternative embodiment, the second intermediate coating is a cross-linked coating that remains quite soft. In this embodiment, the second intermediate coating preferably has a Young's modulus that is substantially the same as, or lower than, the Young's modulus of the primary coating, and a $T_g$ that is substantially the same as, or lower than, the $T_g$ of the primary coating. The Young's modulus is preferably less than about 1 MPa, more preferably between about 0.01 MPa and about 0.5 MPa, most preferably between about 0.03 MPa and about 0.3 MPa. According to one embodiment, the Young's modulus of the second intermediate coating is at least about 30% lower than the Young's modulus of the primary coating, more preferably at least about 40% lower, most preferably at least about 50% lower. The $T_g$ of the second intermediate coating is preferably between about −100° C. and about −30° C., more preferably between about −100° C. and about −40° C., most preferably between about −100° C. and about −50° C.

The second intermediate coating has a thickness that is less than about 40 µm, more preferably in the range of about 20 to about 40 µm, most preferably about 20 to about 30 µm.

Importantly, the second intermediate coating preferably omits expensive additives that are useful for modifying certain properties of the cured product when used as primary coating, such as adhesion promoters and surfactants. Preferably, the second intermediate coating composition contains less than 0.25 pph, more preferably less than 0.15 pph, and most preferably less than 0.05 pph of adhesion promoter; and less than 0.25 pph, more preferably less than 0.15 pph, and most preferably less than 0.05 pph of surfactant. These additives can be entirely omitted, because the second intermediate coating does not contact the glass fiber. According to one embodiment, the second intermediate coating is identical to the primary coating, but entirely omits the adhesion promoter.

One preferred class of second intermediate coating compositions, which form cross-linked coatings, are the UV-curable pressure-sensitive compositions as described in U.S. Pat. No. 6,869,981 to Fewkes, which is hereby incorporated by reference in its entirety.

Exemplary second intermediate coatings include, without limitation, the following formulations:

(1) 40 weight percent nonyl phenol ethoxylated monoacrylate (Ph4003, Cognis Corp.), 5 weight percent neopentyl glycol propoxylated diacrylate (Ph4127, Cognis Corp.), 52 weight percent polyether urethane acrylate oligomers (BR3731, Sartomer Co.), 1.5 weight percent 1-hydroxycyclohexylphenyl ketone (Irgacure 184, Ciba Specialty), 1.5 weight percent bis(2,4,6-trimethylbenzoyl)-phenylphosphineoxide (Irgacure 819, Ciba Specialty), 1 pph thiodiethylene bis(3,5-ditertbutyl-4-hydroxy hydrocinnamate (Irganox 1035, Ciba Specialty), 1 pph 3-acryloxypropyltrimethoxysilane (Gelest), 0.3 pph 3-mercaptopropyltrimethoxysilane (Gelest), and 20 pph Sylvatac RE-40N Rosin Ester (Arizona Chemical Company);

(2) 43 weight percent nonyl phenol ethoxylated monoacrylate (Ph4003, Cognis Corp.), 2 weight percent neopentyl glycol propoxylated diacrylate (Ph4127, Cognis Corp.), 52 weight percent polyether urethane acrylate oligomers (BR3731, Sartomer Co.), 1.5 weight percent 1-hydroxycyclohexylphenyl ketone (Irgacure 184, Ciba Specialty), 1.5 weight percent bis(2,4,6-trimethylbenzoyl)-phenylphosphineoxide (Irgacure 819, Ciba Specialty), 1 pph thiodiethylene bis(3,5-ditertbutyl-4-hydroxy hydrocinnamate (Irganox 1035, Ciba Specialty), 1 pph 3-acryloxypropyltrimethoxysilane (Gelest), and 15 pph Sylvatac RE-40N Rosin Ester (Arizona Chemical Company); and (3) 30 weight percent nonyl phenol ethoxylated monoacrylate (Ph4003, Cognis Corp.), 15 weight percent caprolactone acrylate (Tone M-100, Union Carbide), 52 weight percent polyether urethane acrylate oligomer (BR3741, Bomar Specialty), 1.5 weight percent 1-hydroxycyclohexylphenyl ketone (Irgacure 184, Ciba Specialty), 1.5 weight percent bis(2,4,6-trimethylbenzoyl)-phenylphosphineoxide (Irgacure 819, Ciba Specialty), 1 pph thiodiethylene bis(3,5-ditertbutyl-4-hydroxy hydrocinnamate (Irganox 1035, Ciba Specialty), 1 pph 3-acryloxypropyltrimethoxysilane (Gelest), and 0.5 pph Sylvalite RE 10LRosin (Arizona Chemical Company).

In addition to these second intermediate coating compositions, any of the above-identified primary coating compositions as well as the above-listed second intermediate coating compositions can be modified to omit the adhesion promoters.

According to one preferred embodiment of a four-coating optical fiber, the coating compositions are selected such that the resulting coatings have the following arrangement: a first intermediate coating that has one or both of a Young's modulus that is higher than a Young's modulus of the primary coating, and a glass transition temperature ($T_g$) that is higher than a $T_g$ of the primary coating; a second intermediate coating that has one or both of a Young's modulus that is lower than the Young's modulus of the first intermediate coating, and a $T_g$ that is lower than the $T_g$ of the first intermediate coating; and a secondary coating that has one or both of a Young's modulus that is higher than the Young's modulus of the second intermediate coating, and a $T_g$ that is higher than the $T_g$ of the second intermediate coating. In this arrangement, the thickness of the coatings are such that one or both of the second intermediate coating and secondary coating have a thickness that is between about 1 to about 10 times the thickness, more preferably about 1 to about 8 times the thickness, most preferably about 1 to about 6 times the thickness of, respectively, the primary coating and the first intermediate coating.

Figure 2:
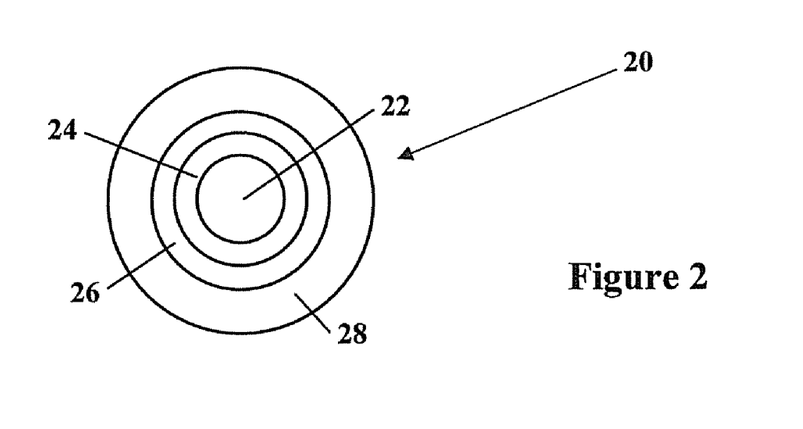
FIG. 2 is a cross-sectional view of a three-layer coating on an optical fiber according to a second embodiment of the present invention.

Referring now to FIG. 2, an optical fiber 20 according to a second embodiment of the present invention includes a fiber 22 and three coatings 24, 26, and 28 which encapsulate the fiber 22. Coating 24 is the primary (innermost) coating, and it serves the traditional purpose of a primary coating. Coating 28 is the outer coating, and it serves the traditional purpose of a secondary coating. Between the primary and secondary coatings is the sole intermediate coating 26. It is the presence of this intermediate coating that allows for the improved microbend performance.

Coatings 24, 26, and 28 can generally be of the same type as described above with respect to coatings 14, 16, and 18 in the first embodiment.

According to one preferred construction of this second embodiment, the primary coating 24 has a Young's modulus of about 0.1 to about 3 MPa and/or a glass transition temperature ($T_g$) of about −100° C. to about −30° C., and the intermediate coating 26 has one or both of a Young's modulus that is substantially the same as, or lower than, the Young's modulus of the primary coating 24, and a $T_g$ that is substantially the same as, or lower than, the $T_g$ of the primary coating. The secondary coating 28 is typically selected such that its Young's modulus and $T_g$ are higher than those of the intermediate coating 26.

In one embodiment, the coating composition used form the intermediate coating is the polymerization product of a composition that is substantially the same as, and preferably otherwise identical to the composition that forms the primary coating composition except that any adhesion promoter present in the primary coating composition is omitted from the intermediate coating composition.

Figure 3:
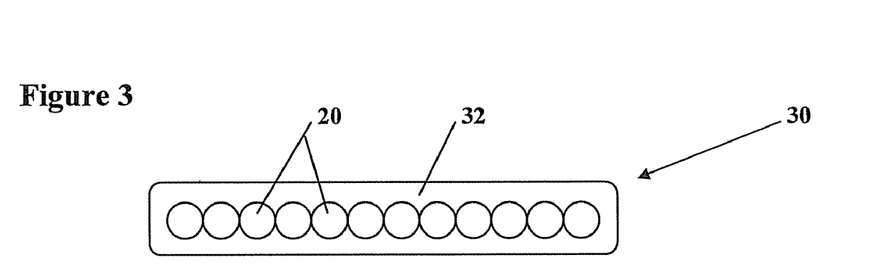
FIG. 3 is a cross-sectional view of an optical fiber ribbon of the present invention, containing one or more optical fibers of the present invention.

The optical fibers of the present invention can also be formed into an optical fiber ribbon which contains a plurality of substantially aligned, substantially coplanar optic fibers encapsulated by a matrix material. One exemplary construction of the ribbon is illustrated in FIG. 3, where ribbon 30 is shown to possess twelve optical fibers 20 encapsulated by matrix 32. The matrix material can be made of a single layer or of a composite construction. Suitable matrix materials include polyvinyl chloride or other thermoplastic materials as well as those materials known to be useful as secondary coating materials. In one embodiment, the matrix material can be the polymerization product of the composition used to form the outer coating.

The optical fibers of the present invention can be prepared using conventional draw tower technology for the preparation of the glass fiber and coatings thereof. Briefly, the process for making a coated optical fiber in accordance with the invention involves fabricating glass fiber 12, coating the glass fiber with the primary coating composition, one or more intermediate coating compositions, and the secondary coating composition, and then curing all coatings simultaneously. This is known as a wet-on-wet process. Optionally, each subsequently applied coating composition can be applied to the coated fiber either before or after polymerizing the underlying coatings. The polymerization of underlying coatings prior to application of the subsequently applied coatings is known as a wet-on-dry process. When using a wet-on-dry process, additional polymerization steps must be employed.

It is well known to draw glass fibers from a specially prepared, cylindrical preform which has been locally and symmetrically heated to a temperature, e.g., of about 2000° C. As the preform is heated, such as by feeding the preform into and through a furnace, a glass fiber is drawn from the molten material. The primary, intermediate, and secondary coating compositions are applied to the glass fiber after it has been drawn from the preform, preferably immediately after cooling. The coating compositions are then cured to produce the coated optical fiber. The method of curing can be thermal, chemical, or radiation induced, such as by exposing the uncured coating composition on the glass fiber to heat or ultraviolet light or electron beam, depending upon the nature of the coating composition(s) and polymerization initiator being employed. It is frequently advantageous to apply both the primary coating composition and any secondary coating compositions in sequence following the draw process. Methods of applying dual layers of coating compositions to a moving glass fiber are disclosed in U.S. Pat. No. 4,474,830 to Taylor and U.S. Pat. No. 4,851,165 to Rennell et al., each of which is hereby incorporated by reference in its entirety.

Figure 4:
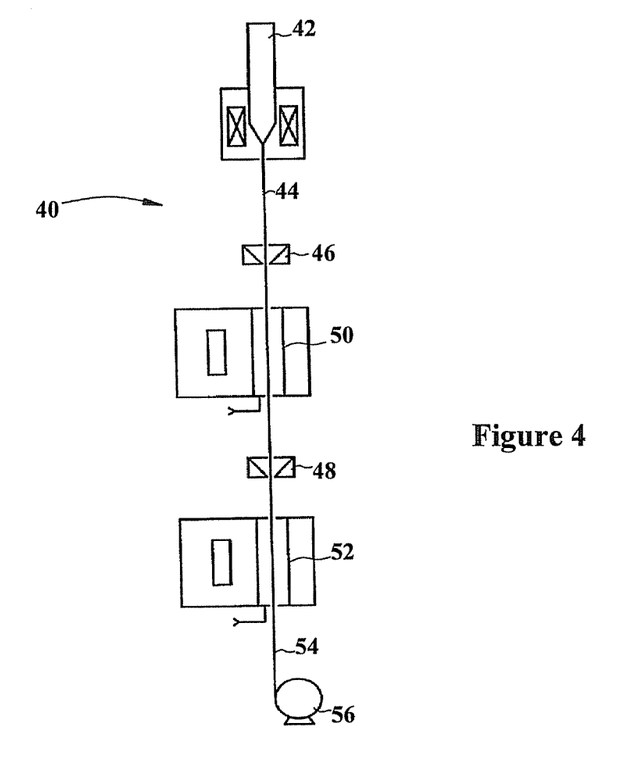
FIG. 4 is a schematic of a process for drawing and coating an optical fiber with a four-coating system.

One embodiment of a process for manufacturing a coated optical fiber in accordance with the invention is further illustrated in FIG. 4, generally denoted as 40. As shown, a sintered preform 42 (shown as a partial preform) is drawn into an optical fiber 44. The fiber 44 passes through coating elements 46 and 48, which can include one or more dies that allow for the application of single coating compositions or multiple coating compositions as is known in the art. The dies also adjust the coating thickness to the desired dimension. Preferably, primary and first intermediate coatings are applied to fiber 44 in element 46, and second intermediate and secondary coatings are applied to fiber 44 in element 48. Curing element 50 is located downstream from element 46 and curing element 52 is located downstream from element 48 to cure the coatings applied to fiber 44. Alternatively, the coatings applied in element 46 may be cured subsequently to fiber 44 passing through element 48. Tractors 56 are used to pull a coated optical fiber 54 through element 52.

As will be appreciated by persons of skill in the art, the system shown in FIG. 4 can be modified to accommodate the application and curing of coatings individually or simultaneously via any combination of the known wet-on-wet or wet-on-dry processes. According to one approach, one or both of the primary and first intermediate coatings can be cured prior to application of the second intermediate and secondary coating compositions. Alternatively, all four coating compositions can be applied to the fiber and then subsequently cured in a single polymerization step.

Having prepared the optical fiber or fiber ribbons in accordance with the present invention, these materials can be incorporated into a telecommunications system for the transmission of data signals.

EXAMPLES

The invention will be further clarified by the following examples which are intended to be exemplary of the invention.

Example 1

Fabrication of Four-Coating Optical Fiber

A G652 compliant standard single mode optical fiber having a diameter of about 125 μm was coated on a draw tower using the compositions described below. The coatings were cured with a single dose of actinic radiation during the draw six lamps with 375 W/in bulbs) at 20 m/s).

Test Fiber 1 contained a 125 μm commercial glass fiber, a 4 μm primary coating (0.170 MPa, −27° C. $T_g$) formed using Composition A (to 133 μm diam.), an 8 μm first intermediate coating (1.0 GPa, 64° C. $T_g$) formed using Composition B (to 149 μm diam.), a 22 μm second intermediate coating (0.125 MPa, −26° C. $T_g$) formed using Composition C (to 193 μm diam.), and a 26 μm outer coating (1.6 GPa, 68° C. $T_g$) formed using Composition D (to 245 μm diam.).

Test Fiber 2 contained a 125 μm commercial glass fiber, a 5 μm primary coating (0.125 MPa, −26° C. $T_g$) formed using Composition C (to 135 μm diam.), a 9.5 μm first intermediate coating (1.0 GPa, 64° C. $T_g$) formed using Composition B (to 154 μm diam.), a 21 μm second intermediate coating (0.125 MPa, −26° C. $T_g$) formed using Composition C (to 196 μm diam.), and a 24.5 μm outer coating (1.6 GPa, 68° C. $T_g$) formed using Composition D (to 245 μm diam.).

Composition A was formulated using 52 wt % urethane acrylate oligomer (BR3741, Bomar), 41.5 wt % ethoxylated nonyl phenol acrylate monomer (Photomer 4003, Cognis), 5 wt % caprolactone acrylate monomer (Tone M-100, Dow), and 1.5 wt % Irgacure 819 photoinitiator (Ciba), to which was added 1 pph Irganox 1035 antioxidant (Ciba), 1 pph 3-acryloxypropyltrimethoxysilane (Gelest), and 0.032 pph pentaerythritol tetrakis (3-mercaptopropionate) (Aldrich).

Composition B is a commercially available outer (secondary) coating formulation with an elastic modulus of 1.0 GPa at 23° C. and a $T_g$ of 64° C. based on the tan delta peak assignment, measured by Dynamic Mechanical Analysis on a 75 microns thick film cured at 1.0 j/cm2 by Fusion D bulb.

Composition D was formulated using 10 wt % polyether urethane acrylate (KWS 4131, Bomar), 5 wt % bisphenol A diglycidyl diacrylate (Photomer 3016, Cognis), 82 wt % ethoxylated (4) bisphenol A diacrylate (Photomer 4028, Cognis), 1.5 wt % Lucirin TPO photoinitiator (BASF), and 1.5 wt % Irgacure 184 photoinitiator (Ciba), to which was added 0.5 pph Irganox 1035 antioxidant (Ciba).

The optical fibers were later spooled and tested for microbend losses.

Example 2

Simulated Testing of Fiber Displacement in Four-Coating Optical Fiber

The effect of the four-layer coating system on fiber core displacement was assessed theoretically. In the model, a short (0.2 cm) length of fiber is anchored at both ends and the midpoint is deflected upward with a constant force. The magnitude of the core displacement is estimated using a 3-D finite-element analysis. It generally depends on the applied force and the moduli and thicknesses of the layers. This is relevant, because the predictive core displacement should correlate with microbend losses.

Figure 5:
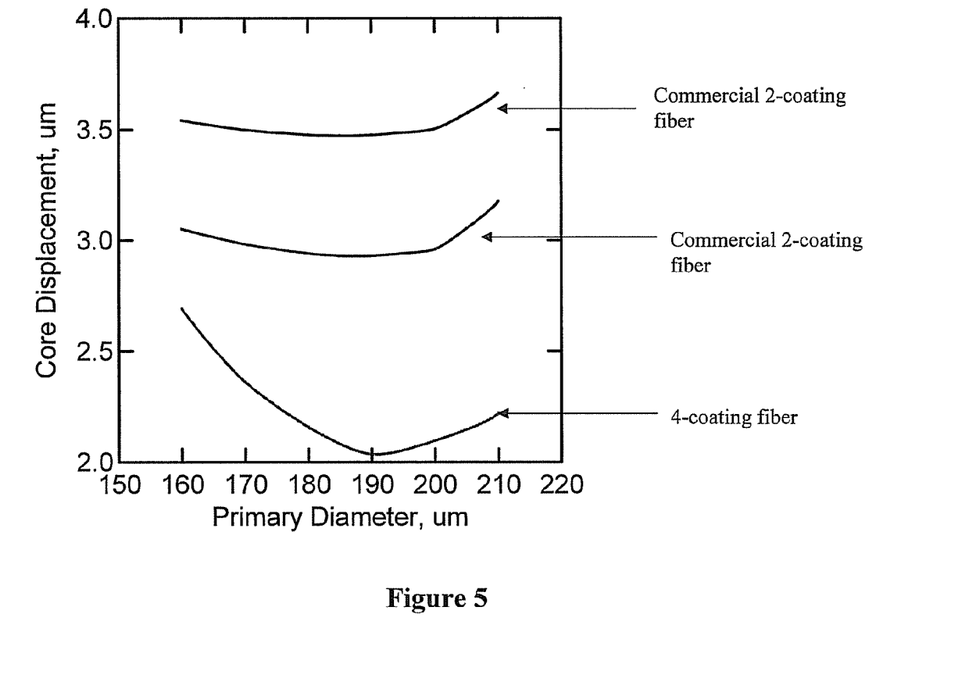
FIG. 5 is a graph illustrating relative predicted displacement of the core for two commercial G652 compliant optical fibers versus an optical fiber containing a four-layer coating systems. The core displacement can be reduced in the four-coating system when the second intermediate coating layer extends beyond about 190 μm from the core center. This indicates that a four-layer coating should outperform the two-layer coatings in microbending performance, because the second intermediate layer can be much softer than the primary coating in the two-layer version.

FIG. 5 is a graph illustrating relative predicted displacement of the core of two commercial, G652 compliant optical fibers having two-layer coatings versus a fiber containing a four-layer coating system. The primary coating thickness varies per the x-axis, while the outside fiber diameter is 244 µm. As shown, the expected core displacement under constant load of about 9400 dynes in two-coating fibers should be much higher than the core displacement in four-coating systems. Unlike the two-coating systems, where little flexibility is afforded in the dimension of the primary coating, the dimension of the second intermediate coating can be easily controlled to minimize core displacement (and maximize microbend resistance). Theoretically, in the modeled system, cooperation among the four-layers coatings should reduce core displacement.

Thus, the four-layer coatings of the present invention should outperform conventional two-layer coatings in microbending performance.

Example 3

Measurement of Attenuation Losses for Test Fibers 1 and 2

Test Fibers 1 and 2 were subjected to a basketweave test for microbend losses. The optical fibers were wound loosely under low tension, and then rewound at high tension in a basketweave pattern. The basketweave winding pattern is one in which there are several fiber crossover points for each wound convolution. Attenuation losses were measured at 1310 nm, 1550 nm, and 1625 nm following thermocycling of the optical fibers at various temperatures between −60 and 70° C.

Figure 6:
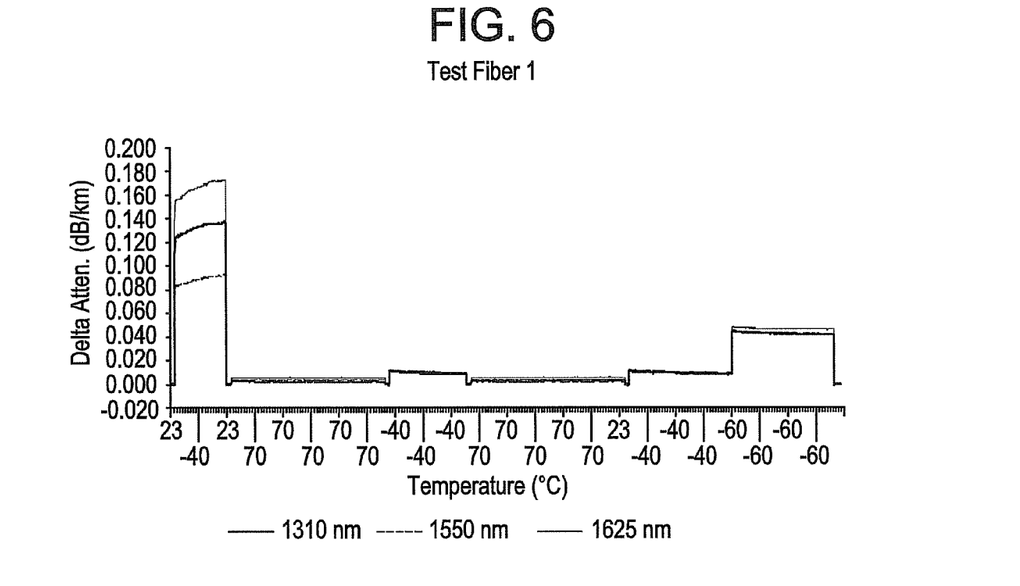
FIG. 6 is a graph illustrating the microbend performance of Test Fiber 1 with attenuation losses at 1310 nm, 1550 nm, and 1625 nm during thermocycling from −60 to 70° C.
Figure 7:
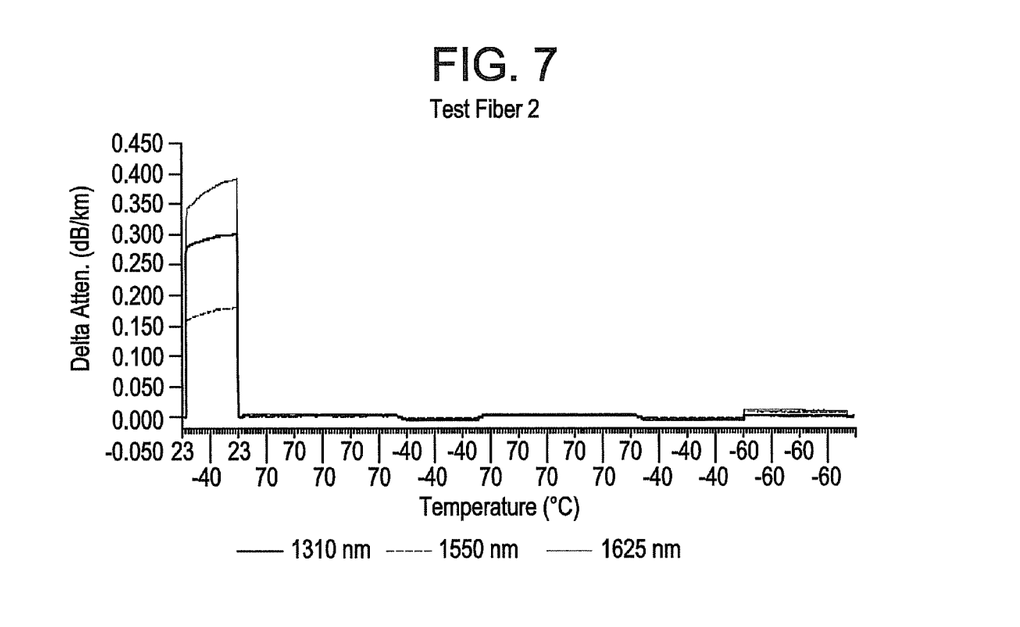
FIG. 7 is a graph illustrating the microbend performance of Test Fiber 2 with attenuation losses at 1310 nm, 1550 nm, and 1625 nm during thermocycling from −60 to 70° C.

Initial thermocycling resulted in high losses prior to reaching 70° C. It is believed that this was a consequence of imperfections in the coating systems following initial cure. However, the 70° C. soak appeared to remedy these defects, and subsequent attenuation losses were vastly improved even at −60° C. The results demonstrate that both of Test Fibers 1 and 2 exhibited improved microbend performance at 1625 nm as compared to fibers bearing commercial coatings, while losses at 1310 nm and 1550 nm were comparable to control coatings (FIGS. 6 and 7). Thus, the four-coating systems demonstrate improved microbend performance, and it is expected that further improvements can be attained by optimization of the coating combinations.

Example 4

Estimate of Core Displacement Following Measurement of Microbending Losses by Wire-Mesh Drum Test The microbending losses of 4-layer (Test Fibers 1 and 2) and standard 2-layer coated optical fiber samples were compared using the wire-mesh drum test. In this test, the loss of 750 m of fiber was measured three times on a tension-free drum with a large diameter and smooth surface. The fiber as then wound under tension (e.g., 80 or 100 grams) onto an aluminum drum covered with a wire mesh and the loss was again measured three times. The difference between the average attenuation while tension free and the average attenuation while under tension is the calculated microbending loss.

In theory, the microbending loss of coated optical fibers is proportional to the displacement of the core, as demonstrated by Gloge, "Optical Fiber Packaging and its Influence on Fiber Straightness and Loss," Bell System Technical Journal 54, 2, pg. 245 (1975), which is hereby incorporated by reference in its entirety. The displacement, in turn, is related to the mechanical properties of the fiber and the coating, to the force applied, and to the roughness of the surface the fiber is pressed against. The displacement was estimated via a finite-element solution under the assumption of a constant force applied to the mid-point of a known length of fiber. An approximate method of calculating core displacement is described by Baldauf et al., "Relationship of Mechanical Characteristics of Dual Coated Single Mode Optical Fibers and Microbending Loss," IEICE Trans. Commun E76-B(4):352-357 (1993), which is hereby incorporated by reference in its entirety.

The added losses measured for several differently-coated optical fibers wound at 100 grams tension were compared to the prediction of the core-displacement model. The core displacement parameters were estimated using the moduli and thickness of the four coating layers identified in Example 1 above. The core displacement parameters of two coating fibers were estimated using the moduli and thickness of the presented in Table 1 below.

TABLE 1

Coating Moduli of Dual Coated Optical Fibers

| Control Fiber | Primary modulus, MPa | Secondary modulus, GPa |
|---|---|---|
| 1 | 0.263 | 1.59 |
| 2 | 0.126 | 1.68 |
| 3 | 0.358 | 1.0 |
| 4 | 0.358 | 1.0 |

Figure 8:
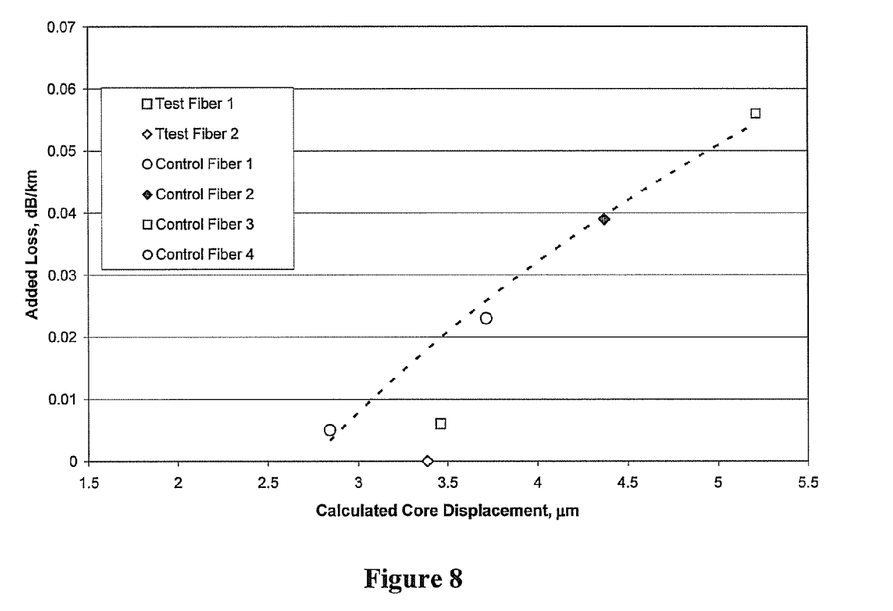
FIG. 8 is a graph illustrating the predicted core displacement based upon the attenuation losses measured in a wire-mesh drum test at 100 gram tension. The calculated displacement values are estimated based on the measured attenuation loss and the moduli and thickness of the respective coating layers.

The loss in dB/km is a logarithmic function of the displacement. This confirms the linear relationship between the loss and the displacement, as dB is a logarithmic measure. As shown in FIG. 8, both of the four layer fibers (Test Fibers 1 and 2) lie below the curve. This is likely the result of an undercured third layer, as the coatings were applied in two stages, and the third layer was exposed to only half the lamps of the first and second layers layer. Nevertheless, this reduced loss demonstrates that a very low modulus second intermediate layer can result in greatly improved microbending performance.

Example 5

Preparation of Three-Coating Optical Fiber

An optical fiber of the type illustrated in FIG. 2 was prepared using a primary coating and intermediate coating that are identical but for omission of the adhesion promoter from the intermediate coating.

The primary and intermediate coating formulations both contained 52 weight percent polyether urethane acrylate oligomer (BR 3741, Bomar Specialty), 40 weight percent ethoxylated(4) nonylphenol acrylate (Photomer 4003, Cognis Corp.), 5 weight percent N-vinyl pyrollidinone, 1.5 weight percent bis(2,4,6-trimethyl benzoyl)phenyl-phosphine oxide (Irgacure 819, Ciba Specialty), 1.5 weight percent 1-hydroxycyclohexylphenyl ketone (Irgacure 184, Ciba Specialty), and 1 pph thiodiethylene bis(3,5-di-tert-butyl)-4-hydroxyhydrocinnamate (Irganox 1035, Ciba Specialty). The primary coating formulation also contained 1 pph 3-acryloxypropyltrimethoxysilane, whereas the intermediate coating formulation did not.

Test Fiber 3 was made with these primary and intermediate coatings, and their total diameter was adjusted during draw to 190 μm. The primary coating had a thickness of about 7.5 μm and the intermediate coating has a thickness of about 25 μm.

Two two-coating control fibers were prepared. Control Fiber 5 was prepared using the same primary coating formulation as used in Test Fiber 3 except that the thickness of the primary coating was adjusted during draw to a total diameter of 190 μm (about 32.5 μm thick). Control Fiber 6 was prepared using the intermediate coating formulation as used in Test Fiber 3 (as the primary coating) except that the thickness of the primary coating was adjusted during draw to a total diameter of 190 μm (about 32.5 μm thick).

All three fibers were prepared with the same secondary coating formulation, which results in a coating having a Young's modulus of 1,642 MPa and a $T_g$ of 65° C. The thickness of the secondary coating formulation was adjusted during draw to a total fiber diameter of 245 μm.

Test Fiber 3 was prepared using a wet-on-wet coating technique, such that the intermediate coating layer was applied onto the primary coating layer while it is still in liquid state (not cured). This was achieved using a wet-on-wet coater block where two layer coatings are applied sequentially on the same block. The primary coating formulation with adhesion promoter was placed in the top chamber of the coater block and the intermediate coating formulation was placed in the bottom chamber. Both layers were cured as whole by a bank of UV lights, and then the secondary coating was applied and cured.

Control Fibers 5 and 6 were prepared using a wet-on-dry coating technique, whereby each layer applied to the glass fiber was cured prior to application of the secondary coating formulation. Thereafter, the secondary coating was applied and cured.

All three optical fibers were later spooled and tested for micro-delamination formation.

Example 6

Micro-Delamination Testing of Three-Coating Optical Fibers

Test Fiber 3 and Control Fibers 5 and 6 were subjected to a micro-delamination test. For each, a fiber loose coil was soaked in a water bath at either ambient temperature or 65° C. for up to 30 days. The fiber was retrieved from the bath, blotted dry and inspected under a microscope for any delamination sites at the interface of glass and primary coating periodically.

Neither Test Fiber 3 nor Control Fiber 5 showed any signs of delamination at either ambient temperature or 65° C. for up to 30 days. Control Fiber 6, lacking any adhesion promoter in its primary coating, exhibited heavy delamination. This confirms that there is no difference between a three-coating fiber of the present invention and a two-coating fiber in the wet adhesion performance By confining to the primary coating (with adhesion promoter) to a thin film applied directly to the glass fiber and using an intermediate coating with matched properties (but lacking the adhesion promoter), a significant reduction in the amount of adhesion promoter used per unit length can be achieved. This translates into lower costs for fiber production, and should not have any deleterious effect on fiber performance.

Although preferred embodiments have been depicted and described in detail herein, it will be apparent to those skilled in the relevant art that various modifications, additions, substitutions, and the like can be made without departing from the spirit of the invention and these are therefore considered to be within the scope of the invention as defined in the claims which follow.

What is claimed:

1. An optical fiber comprising:
    a glass fiber; and
    three or more coatings that encapsulate the glass fiber, where the three or more coatings comprise a primary coating in contact with said glass fiber, an intermediate coating that surrounds the primary coating, and an outer coating that surrounds the intermediate coating;
    wherein the primary coating comprises a Young's modulus of about 0.025 to about 3 MPa and a glass transition temperature ($T_g$) of about −100° C. to about −25° C., and the intermediate coating comprises one or both of a Young's modulus that is substantially the same as, or lower than, the Young's modulus of the primary coating, and a $T_g$ that is substantially the same as, or lower than, the $T_g$ of the primary coating; and
    wherein the outer coating of the optical fiber has a diameter that is less than about 300 μm.

2. The optical fiber according to claim 1, wherein the intermediate coating comprises one or both of a Young's modulus that is less than about 0.2 MPa, and a $T_g$ of about −100° C. to about −25° C.

3. The optical fiber according to claim 1, wherein the outer coating comprises one or both of a Young's modulus of about 0.5 to about 8.0 GPa, and a $T_g$ of about 50° C. to about 120° C.

4. The optical fiber according to claim 1, wherein the primary coating has a thickness of less than about 15 μm.

5. The optical fiber according to claim 1, wherein the intermediate coating has a thickness of less than about 15 μm.

6. The optical fiber according to claim 1, wherein the outer coating has a thickness of less than about 40 μm.

7. The optical fiber according to claim 1, wherein the three or more coatings have a thickness that is less than about 60 μm.

8. The optical fiber according to claim 1, wherein
    the primary coating is the polymerization product of a composition comprising one or more cross-linkable agents, a polymerization initiator, and an adhesion promoter; and the intermediate coating is the polymerization product of a composition that is the same as the composition that forms the primary coating except for omission of the adhesion promoter.

9. An optical fiber comprising:
a glass fiber; and
at least four coatings that encapsulate the glass fiber, where the at least four coatings comprise a primary coating in contact with said glass fiber, a first intermediate coating that surrounds the primary coating, a second intermediate coating that surrounds the first intermediate coating, and an outer coating that surrounds the second intermediate coating;
wherein the first intermediate coating comprises one or both of a Young's modulus that is higher than a Young's modulus of the primary coating, and a glass transition temperature ($T_g$) that is higher than a $T_g$ of the primary coating;
wherein the second intermediate coating comprises one or both of a Young's modulus that is lower than the Young's modulus of the first intermediate coating, and a $T_g$ that is lower than the $T_g$ of the first intermediate coating;
wherein the outer coating comprises one or both of a Young's modulus that is higher than the Young's modulus of the second intermediate coating, and a $T_g$ that is higher than the $T_g$ of the second intermediate coating; and
wherein the optical fiber has a diameter that is less than about 300 μm.

10. The optical fiber according to claim 9, wherein the second intermediate coating comprises one or both of a Young's modulus that is substantially the same as, or lower than, the Young's modulus of the primary coating, and a $T_g$ that is substantially the same as, or lower than, the $T_g$ of the primary coating.

11. The optical fiber according to claim 9, wherein the primary coating comprises one or both of a Young's modulus of about 0.025 to about 3 MPa, and a $T_g$ of about −100° C. to about −25° C.

12. The optical fiber according to claim 11, wherein the first intermediate coating comprises one or both of a Young's modulus of about 0.1 to about 2.0 GPa, and a $T_g$ of about 0° C. to about 60° C.

13. The optical fiber according to claim 12, wherein the second intermediate coating comprises one or both of a Young's modulus that is less than about 0.2 MPa, and a $T_g$ of about −100° C. to about −30° C.

14. The optical fiber according to claim 13, wherein the outer coating comprises one or both of a Young's modulus that is about 0.1 to about 2.0 GPa, and a $T_g$ of about 50° C. to about 120° C.

15. The optical fiber according to claim 9, wherein the primary coating has a thickness of less than about 15 μm.

16. The optical fiber according to claim 9, wherein the first intermediate coating has a thickness of less than about 15 μm.

17. The optical fiber according to claim 9, wherein the second intermediate coating has a thickness of less than about 40 μm.

18. The optical fiber according to claim 9, wherein the outer coating has a thickness of less than about 40 μm.

19. The optical fiber according to claim 9, wherein the four or more coatings have a thickness that is less than about 60 μm.

20. The optical fiber according to claim 9, wherein one or both of the second intermediate coating and outer coating have a thickness that is between about 2 to about 10 times the thickness of, respectively, the primary coating and the first intermediate coating.

* * * * *